US011286778B2

(12) United States Patent
Milliasseau et al.

(10) Patent No.: US 11,286,778 B2
(45) Date of Patent: Mar. 29, 2022

(54) METHOD FOR EXTRACTING A FOREIGN BODY LODGED IN A HIGH-PRESSURE DISTRIBUTOR BLADE

(71) Applicant: SAFRAN AIRCRAFT ENGINES, Paris (FR)

(72) Inventors: Jean-Claude Milliasseau, Moissy-Cramayel (FR); Christophe Marie Pierre Michel Jehn, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/276,680

(22) PCT Filed: Sep. 12, 2019

(86) PCT No.: PCT/FR2019/052105
§ 371 (c)(1),
(2) Date: Mar. 16, 2021

(87) PCT Pub. No.: WO2020/058601
PCT Pub. Date: Mar. 26, 2020

(65) Prior Publication Data
US 2021/0293147 A1  Sep. 23, 2021

(30) Foreign Application Priority Data

Sep. 17, 2018  (FR) ...................................... 1858353

(51) Int. Cl.
*F01D 5/00* (2006.01)
*F01D 5/28* (2006.01)
(Continued)

(52) U.S. Cl.
CPC ............. *F01D 5/005* (2013.01); *F01D 5/288* (2013.01); *F01D 5/147* (2013.01); *F01D 5/187* (2013.01);
(Continued)

(58) Field of Classification Search
CPC .......... F01D 5/005; F01D 5/288; F01D 5/147; F01D 5/187; F05D 2230/10;
(Continued)

(56) References Cited

FOREIGN PATENT DOCUMENTS

| EP | 2 028 342 A2 | 2/2009 |
|---|---|---|
| EP | 2 995 410 A1 | 3/2016 |
| WO | WO 2005/045198 A1 | 5/2005 |

OTHER PUBLICATIONS

International Search Report as issued in International Patent Application No. PCT/FR2019/052105, dated Dec. 16, 2019.

*Primary Examiner* — Moshe Wilensky
(74) *Attorney, Agent, or Firm* — Pillsbury Winthrop Shaw Pittman LLP

(57) ABSTRACT

A method for extracting at least one foreign body lodged within a blade of a high-pressure distributor of a turbojet engine, the high-pressure distributor including hollow fixed blades between two annular shrouds forming a gas flow path, each blade being coated with a thermal barrier and provided with at least one recess at least partially obstructed by a first soldered closing plate, includes the following operations: cutting off the first closing plate, extracting the foreign body from the recess, carrying out an endoscopic inspection of an internal space of the recess in order to verify that no foreign body remains, positioning a second closing plate on the recess, and soldering the second closing plate directly onto the distributor with the blades coated with the thermal barrier.

7 Claims, 3 Drawing Sheets

(51) Int. Cl.
*F01D 5/14* (2006.01)
*F01D 5/18* (2006.01)
*F01D 9/06* (2006.01)

(52) U.S. Cl.
CPC .......... *F01D 9/065* (2013.01); *F05D 2230/10* (2013.01); *F05D 2230/237* (2013.01); *F05D 2230/40* (2013.01); *F05D 2230/80* (2013.01); *F05D 2260/607* (2013.01)

(58) Field of Classification Search
CPC ........... F05D 2230/237; F05D 2230/40; F05D 2230/80; F05D 2230/70; F05D 2230/72; F05D 2260/607; F05D 2260/80
See application file for complete search history.

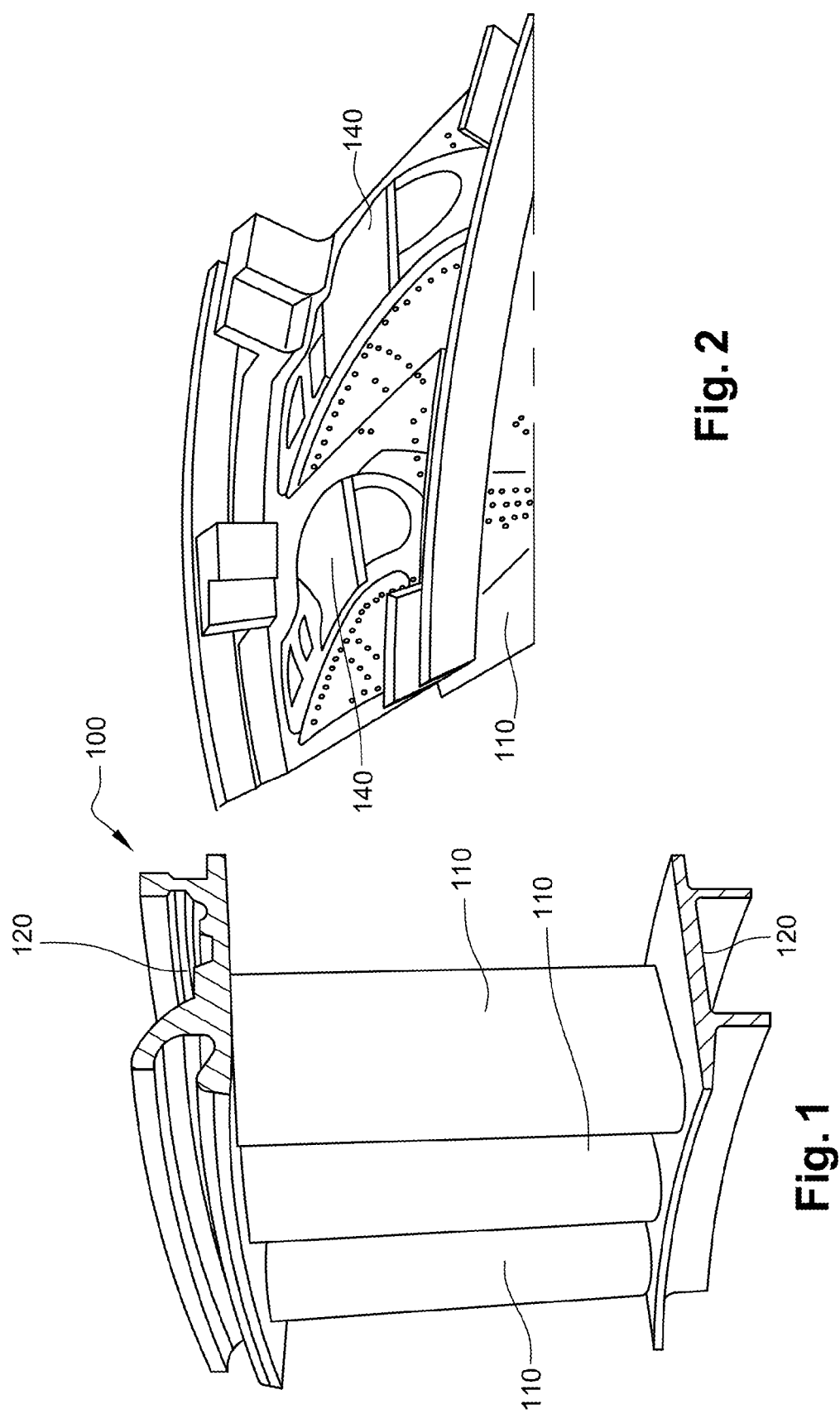

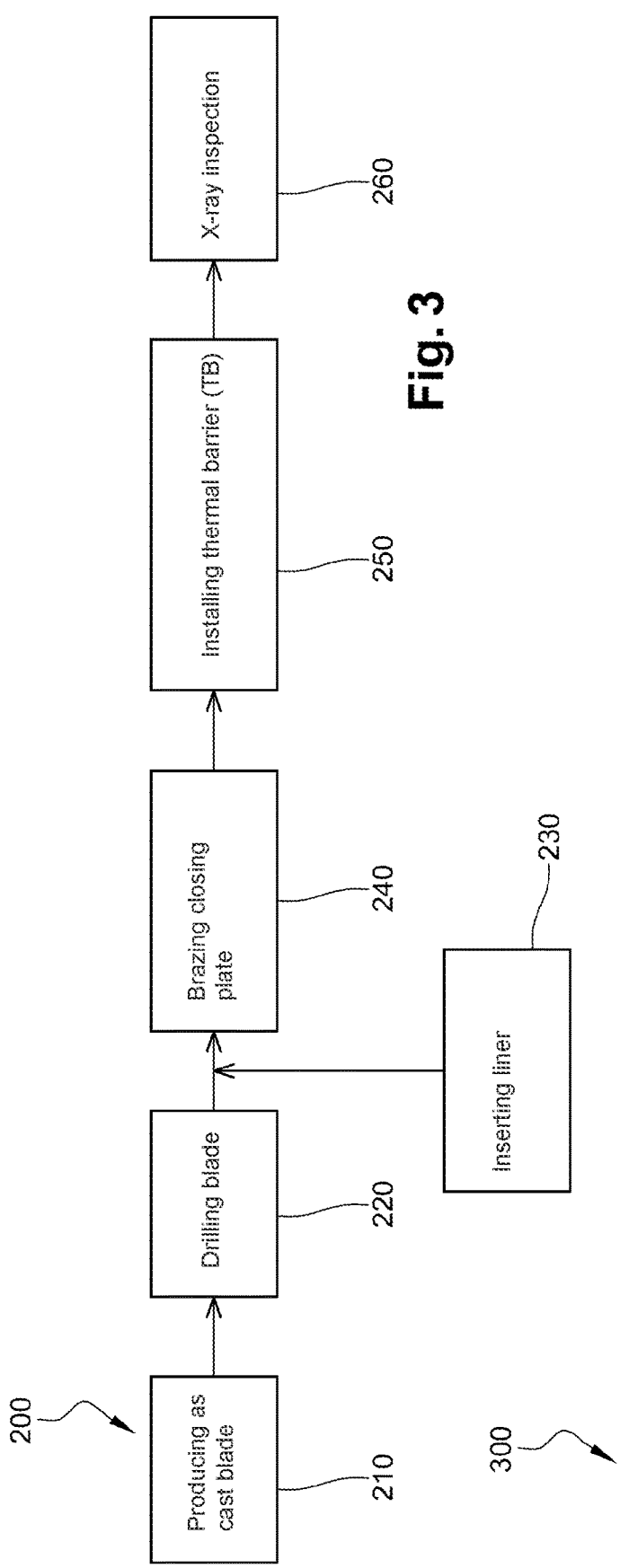
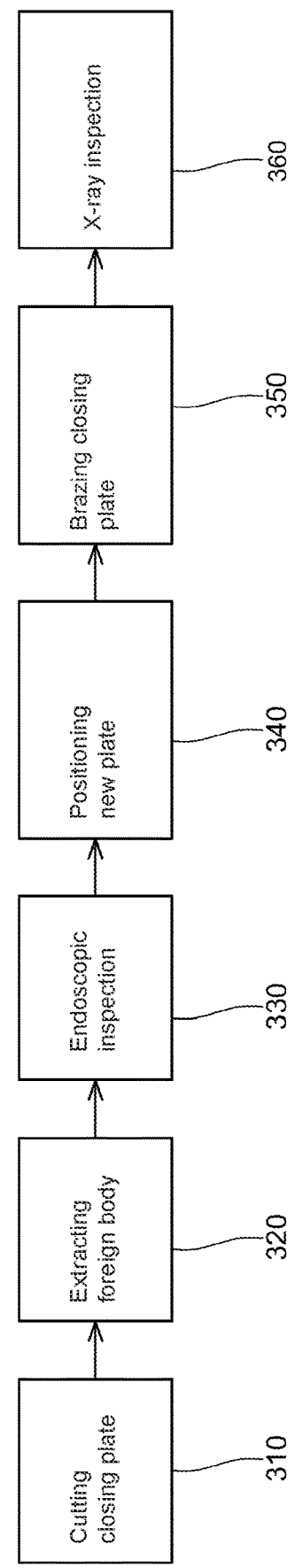

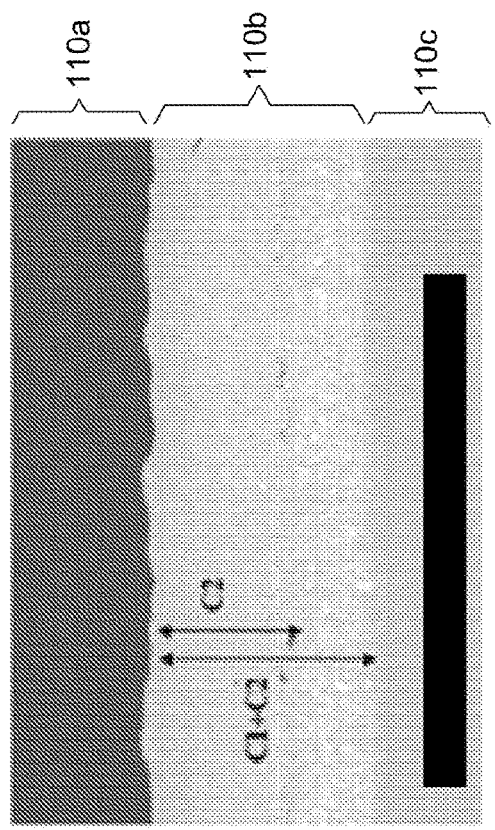
Fig. 5
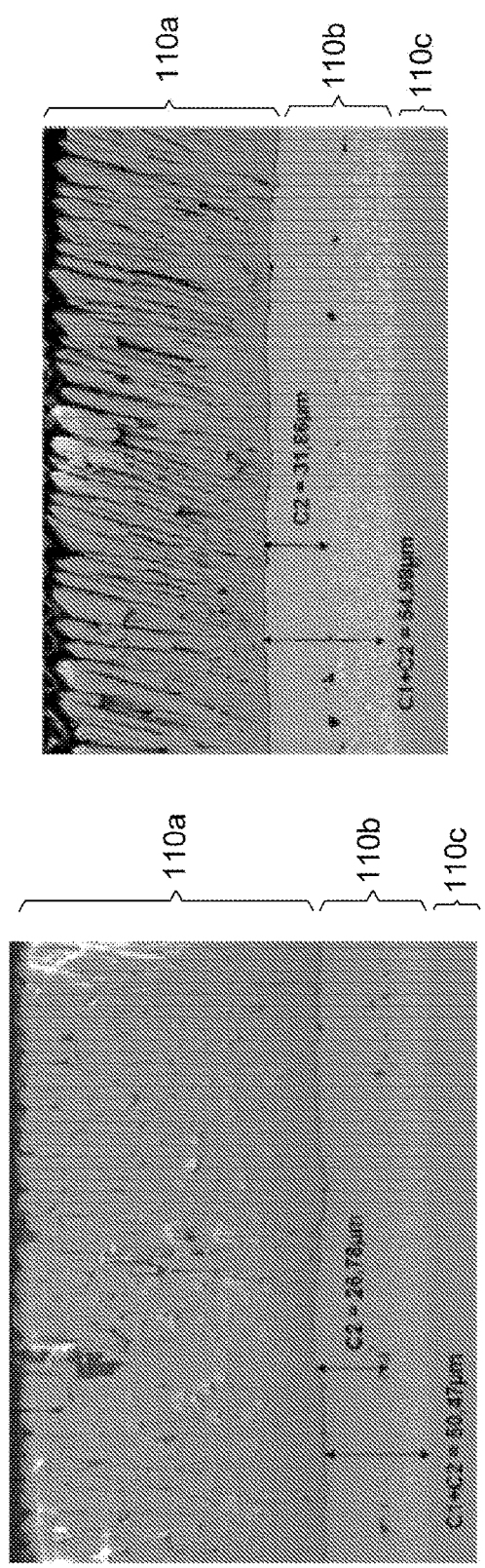
Fig. 6A
Fig. 6B

METHOD FOR EXTRACTING A FOREIGN BODY LODGED IN A HIGH-PRESSURE DISTRIBUTOR BLADE

CROSS-REFERENCE TO RELATED APPLICATIONS

This application is the U.S. National Stage of PCT/FR2019/052105, filed Sep. 12, 2019, which in turn claims priority to French patent application number 1858353 filed Sep. 17, 2018. The content of these applications are incorporated herein by reference in their entireties.

TECHNICAL FIELD

The present invention relates to a method for extracting a foreign body from a high-pressure distributor blade of a turbomachine. It also relates to a method for detecting the presence of a foreign body in a cavity of a high-pressure distributor blade.

The invention finds applications in the field of aeronautics and, in particular, in the field of manufacturing high-pressure distributor blades.

STATE OF THE ART

In an aircraft turbojet engine, the high-pressure distributor 100, an example of which is represented in FIG. 1, is a set of fixed blades 110 arranged between two coaxial annular platforms 120, called shrouds, and delimiting a gas flow stream between the outlet of the combustion chamber and the inlet of the high-pressure turbine. Blades 110, which are generally hollow, each include two adjacent cavities, one end of which opens outside the gas flow stream. They also include holes extending between each cavity and the stream. In some high-pressure distributors, each blade 100 includes a liner embedded in each of the cavities, and drilled with a plurality of holes opening into the cavity, over its entire surface extending between the annular platforms 120. The purpose of this liner is especially to cool the blade in which it is embedded. In some high-pressure distributors, such as the one represented in FIG. 2, it is the hollow blades that are drilled. Whether drilled or provided with a liner, each blade cavity is closed by a closing plate 140 which ensures cooling regulation of the blade by controllably obstructing the cavity apertures.

Airplane engine turbine blades are conventionally made of a nickel-based metal superalloy called AM1 (NiCr7Co8W5Al5Ta8Ti). However, due to their location, blades of high-pressure distributors—also known as HPD—are subject to very high gas temperatures, especially during the so-called "hot" operating phases of the engine, such as, for example, the take-off phase. In order to resist these very high temperatures, HPD blades of AM1 are generally covered with an insulating coating forming a thermal barrier—also called TB. It is known that the thermal barrier consists of several layers, each having a different function. The external layer, i.e. the layer most exposed to hot gases, of the thermal barrier is usually a ceramic layer. The main function of this ceramic layer is heat insulation. The internal layer of the thermal barrier, i.e. the layer in contact with the AM1, is an underlayer usually of an aluminium-platinum alloy such as AlPt. The function of this underlayer is to protect the blade from oxidation and maintain thermal barrier on the AM1.

Generally, HPD blades are manufactured according to the method represented in FIG. 3. This method first consists of a step 210 of producing an as cast blade form. At the end of this step 210, the as cast blade includes two cavities which are drilled in step 220 so that they can subsequently cool the blade. When each cavity is fitted with a liner, the liners are inserted into the cavities of the blade in step 230. A closing plate is then brazed over each cavity to close said cavities (step 240). Once the blade cavities are closed, a thermal barrier is deposited on the outer surface of each blade to protect the blade, in particular from heat. An x-ray inspection is then performed, in step 260, to check whether the blade is in compliance with the specifications. This x-ray inspection is especially used to detect whether the cavities are free of any foreign bodies resulting from manufacturing operations.

Indeed, it is possible, in the casting step as well as in the drilling, brazing or thermal barrier installing steps, that dust or other residues may have settled inside the blade, generating a defect on said blade. But, most defects result in the blade not complying with current technical requirements and a non-compliant blade is discarded.

To date, it is actually common practice to discard any blade considered to be non-compliant as a result of detection of a foreign body in a cavity, as it is considered that in order to remove the foreign body, the thermal barrier covering the blade would first have to be removed. One solution contemplated by airplane engine manufacturers for reworking a HPD blade is as follows:
  Pickling the non-compliant blade so as to remove the thermal barrier covering said blade or at least the ceramic layer of said thermal barrier;
  Taking off the closing plate;
  Removing the foreign body from the cavity;
  Brazing a new closing plate to the bare blade;
  Depositing a new thermal barrier; and
  Performing a new x-ray inspection.

However, such a reworking method would have many drawbacks and, in particular, it would have an impact on the dimension of the blade insofar as pickling the part is equivalent to chemically machining said part of AM1. Another drawback would be the risk of residue when pickling the thermal barrier (especially if the underlayer of AlPt is not removed), which could cause excessive thickness when the new thermal barrier is installed. A further drawback would be the risk of increased non-compliance of the blades due to the installation of the new coatings. Furthermore, implementing such a rework method would be expensive because, as the cost of a thermal barrier is high, it is expensive to install this thermal barrier twice.

SUMMARY OF THE INVENTION

In order to address the problem discussed above of discarding non-compliant blades due to foreign body in a cavity, the applicant provides a method for extracting foreign body wherein only the closing plate is cut and replaced by a new closing plate directly brazed to the blade coated with the thermal barrier.

According to a first aspect, the invention relates to a method for extracting at least one foreign body lodged within a blade of a high-pressure distributor of a turbojet engine, said high-pressure distributor including fixed hollow blades between two annular shrouds forming a gas flow stream, each blade being coated with a thermal barrier and drilled with at least one cavity at least partially obstructed by a first brazed closing plate. This method is characterised in that it includes the following operations of:
  cutting the first closing plate, extracting the foreign body out of the cavity,
endoscopically inspecting an internal space of the cavity to check that no foreign body remains,
positioning a second closing plate on the cavity, and
brazing the second closing plate directly to the distributor with the blades coated with the thermal barrier.

This extraction method makes it possible to rework a blade, considered to be non-compliant at the end of production, by removing the foreign bodies lodged in said blade and causing its non-compliance, without any removing or pickling operation of the thermal barrier.

A "foreign body" is any dust, manufacturing residue or particle deposited or caught in a cavity in a high-pressure distributor blade.

Advantageously, cutting the first plate is performed by grinding said plate.

The extraction method according to the invention may include one or more of the following characteristics:
- positioning the second closing plate is performed by jig boring and shot-peening on the high-pressure distributor;
- the second closing plate is pre-sintered;
- brazing the second plate is performed in a vacuum furnace at a temperature below 1200° C.;
- brazing includes a thermal cycle performed at a temperature between approximately 1160° C. and 1200° C. for 10 to 20 minutes, and then a diffusion cycle at a temperature between approximately 1150° C. and 1200° C. for 2 to 4 hours;
- it includes, after the brazing operation of the second closing plate, an x-ray inspection of the high-pressure distributor.

BRIEF DESCRIPTION OF THE FIGURES

Further advantages and characteristics of the invention will appear upon reading the description, illustrated by the figures in which:

FIG. 1, already described, schematically represents a partial view of a high-pressure distributor of prior art;

FIG. 2, already described, schematically represents a partial view of a high-pressure distributor blade of prior art;

FIG. 3, already described, represents a block diagram of the usual method for producing high-pressure distributor blades;

FIG. 4 represents a block diagram of the method for extracting a foreign body according to the invention;

FIG. 5 represents an enlarged sectional view of the layers of materials forming the thermal barrier covering a high-pressure distributor blade;

FIGS. 6A and 6B represent enlarged cross-sectional views of a thermal barrier before brazing and after re-brazing, respectively.

DETAILED DESCRIPTION OF AT LEAST ONE EMBODIMENT

An example of embodiment of a method for extracting a foreign body lodged in a cavity of a high-pressure distributor blade is described in detail below, with reference to the appended drawings. This example illustrates the characteristics and advantages of the invention. However, it is reminded that the invention is not limited to this example.

In the figures, identical elements are marked by identical references. For reasons of legibility of the figures, scales between the elements represented are not respected.

FIG. 4 represents, as a block diagram, various steps of the extraction method 300 for reworking a blade considered to be non-compliant after the x-ray inspection 260. This method can be applied to any parts of AM1 covered with a thermal barrier such as, for example, a high-pressure distributor blade 110 of the type represented in FIGS. 1 and 2. As previously explained, each high-pressure distributor blade 110—simply referred to as a blade—includes adjacent cavities which can be drilled or have a liner embedded therein. A closing plate 140 is installed by brazing to the open end of each blade cavity to close the cavity and possibly hold the liner therein.

According to the invention, a blade which is considered to be non-compliant at the end of production may be reworked and the foreign body or bodies removed. In order to extract any foreign body detected inside a blade cavity during the x-ray inspection performed at the end of the blade manufacturing method, the extraction method 300 of the invention provides performing a first operation 310 of cutting the original closing plate 140, also referred to as the first plate. This cutting of the closing plate 140 consists in taking off all the material forming the closing plate 140 by means of a grinding wheel. Grinding the closing plate enables only the material forming the closing plate to be removed, without taking off or degrading the thermal barrier coating on the blade.

Once the closing plate 140 has been fully ground, the foreign body or bodies present in the cavity can be removed by means of a suitable tool such as a pin, hook, pliers, etc., during an extraction operation 320. The extraction method 300 can be continued with an endoscope inspection operation 330. This endoscopic inspection 330 makes it possible, by inserting an endoscope into the cavity, to examine the internal space of the cavity and especially its inner walls to check that all foreign bodies have been extracted. It also makes it possible to check whether the grinding operation 310 of the first closing plate has not generated any new dust or other foreign bodies.

After this endoscopic inspection 330, a new closing plate 140, also referred to as the second closing plate, is positioned in front of the cavity opening, approximately at the location where the first closing plate was located. This positioning of the new closing plate 140 is achieved by jig boring and shot-peening said plate on the blade 110 of the high-pressure distributor. The jig boring and shot-peening operation of the closing plate consists in prefixing the plate on the high-pressure distributor blade by means of welding points made, for example, with a solid electrode for jig boring and a hollow electrode for shot-peening.

Once the new closing plate is correctly positioned, the insert can be brazed to the high-pressure distributor during a brazing operation 350. During this brazing operation 350, the new closing plate is brazed directly to the distributor blade coated with the thermal barrier. The new closing plate 140 is a conventional pre-sintered closing plate, identical to the original closing plate. Brazing is performed under vacuum, in an adapted furnace, at a brazing temperature not exceeding 1180° C. +/−10° C. Brazing conditions for the new closing plate 140 are conventional brazing conditions, in which the new closing plate includes a sinter (i.e. a powder agglomerated by simultaneous compression and heating below the melting temperature), and is subjected, together with the high-pressure distributor, to a thermal cycle and a diffusion cycle bringing the assembly to a processing temperature which is below its melting temperature but sufficient for the sinter to be melted and conglomerate the plate with the high-pressure distributor. The thermal cycle may include, for example, a 15-minute vacuum firing at 1180° C. The diffusion cycle, initiated following the thermal cycle, may include, for example, a 3-hour vacuum firing at 1175° C.

In contrast to the brazing operation of the first closing plate, when brazing 350 the new closing plate, the thermal barrier is present on the high-pressure distributor 100. An example of an enlarged sectional view of a blade portion of AM1 coated with this thermal barrier is represented in FIG. 5. This example shows an AM1 layer 110c forming the blade 100, covered with an AlPt underlayer 110b and with a ceramic layer 110a forming the thermal barrier.

In the method of the invention, the high-pressure distributor blade, which has been previously brazed with the original closing plate, is brazed a second time during the brazing operation 350. During this second brazing operation 350, the blade 100 is coated with its thermal barrier. Although those skilled in the art would think that the thermal cycle generated to solder the new closing plate would have a damaging effect on the thermal barrier of the high-pressure distributor, especially through diffusion of the underlayer, the applicant was surprised to find that this was not the case. Indeed, on the one hand, the AM1 blade is adapted to withstand a second thermal cycle with no risk of modification of its structure. On the other hand, the ceramic layer ($ZrO_2/Y_2O_3$) of the thermal barrier is adapted to undergo a thermal cycle at approximately 1180° C. since its melting temperature exceeds 1200° C. Finally, as shown in FIGS. 6A and 6B, the underlayer of the thermal barrier does not migrate inside the blade of AM1. Indeed, even if, under the brazing conditions stated above, the underlayer 110b slightly changes by diffusion, this has no impact on the compliance of the blade 100 of the high-pressure distributor. An example of the structure of AM1 with thermal barrier before the second thermal cycle is represented in FIG. 6A. An example of the same structure of AM1 with thermal barrier after the second thermal cycle (i.e. after re-brazing) is represented in FIG. 6B. A comparison of the two FIGS. 6A and 6B shows that, although the underlayer 110b has slightly migrated into the part of AM1 110c and into the ceramic layer 110a, the thickness $c1+c2$ of underlayer 110b is only slightly smaller than before the first thermal cycle and is therefore large enough to enable the thermal barrier to adhere to and protect the blade of AM1.

The applicant has performed further re-brazing tests with modulated temperatures and firing times—for example a thermal cycle for 10 to 20 minutes at temperatures between approximately 1160° C. and 1200° C. and a diffusion cycle for 2 to 4 hours at temperatures between 1150° C. and 1200° C.—and found that the underlayer 110b hardly changes much and that the microstructure is not modified either by aluminium depletion or by transformation to gamma prime. The precipitate in AM1 remains between 0.3 and 0.7 micron. The thickness $c1+c2$ of the underlayer remains between 40 μm and 75 μm and the proportion $c2/(c1+c2)$ between 50% and 80%. Similarly, the proportion of platinum (Pt) remains between 23% and 40% and the proportion of aluminium (Al) between 17% and 25%, these thicknesses and proportions being compliant with technical requirements DMP32-021.

The operation 350 of brazing the new closing plate 140 therefore enables the new plate to be conglomerated on the high-pressure distributor blade without generating any damaging effect on the structure of the high-pressure distributor. The reworked high-pressure distributor will therefore have the same performance as a standard high-pressure distributor.

The extraction method 300 just described can be supplemented by an operation 360 of x-ray inspecting the high-pressure distributor blade cavity. This inspection operation 360 is implemented at the end of the extraction method 300 to check whether all foreign bodies have been removed from the cavities of the high-pressure nozzle blade.

Although described through a number of examples, alternatives and embodiments, the method for extracting foreign bodies according to the invention includes various, modifications and improvements which will be obvious to those skilled in the art, it being understood that these alternatives, modifications and improvements are within the scope of the invention.

The invention claimed is:

1. A method for extracting at least one foreign body lodged within a blade of a high-pressure distributor of a turbojet engine, said high-pressure distributor including fixed hollow blades between two annular shrouds forming a gas flow stream, each blade being coated with a thermal barrier and drilled with at least one cavity at least partially obstructed by a first brazed closing plate, the method comprising:
cutting the first brazed closing plate,
extracting the foreign body out of the cavity,
endoscopically inspecting an internal space of the cavity to check that no foreign bodies remain,
positioning a second closing plate on the cavity, and
brazing the second closing plate directly to the distributor with the blades coated with the thermal barrier.

2. The extraction method according to claim 1, wherein cutting the first brazed closing plate is performed by grinding said plate.

3. The extraction method according to claim 1, wherein positioning the second closing plate is performed by jig boring on the high-pressure distributor.

4. The extraction method according to claim 1, wherein the second closing plate is pre-sintered.

5. The extraction method according to claim 1, wherein brazing the second closing plate is performed in a vacuum furnace at a temperature below 1200° C.

6. The extraction method according to claim 5, wherein brazing the second closing plate includes a thermal cycle performed at a temperature of between approximately 1160° C. and 1200° C. for 10 to 20 minutes, and then a diffusion cycle at a temperature of between approximately 1150° C. and 1200° C. for 2 to 4 hours.

7. The extraction method according to claim 1, further comprising, after brazing the second closing plate, an operation of X-ray inspecting the high-pressure distributor.

* * * * *